Dec. 24, 1968      W. KIRKMAN      3,418,098

APPARATUS FOR PRESS BENDING GLASS SHEETS

Filed Sept. 13, 1965

INVENTOR.
William Kirkman
BY
Nobbe & Swope
ATTORNEYS

United States Patent Office 3,418,098
Patented Dec. 24, 1968

3,418,098
APPARATUS FOR PRESS BENDING
GLASS SHEETS
William Kirkman, Ottawa, Ill., assignor to Libbey-Owens-
Ford Glass Company, Toledo, Ohio, a corporation of
Ohio
Filed Sept. 13, 1965, Ser. No. 486,907
5 Claims. (Cl. 65—273)

ABSTRACT OF THE DISCLOSURE

Apparatus for press bending glass sheets, including male and female mold parts relatively movable toward and away from one another and having complemental shaping surfaces facing one another, the female mold part comprising tubular members having top, bottom and side walls defining passageways therethrough, with the shaping surface formed on the top walls of said tubular members, and means for introducing a cooling fluid into said passageways to flow therethrough in contact with said top walls.

Specification

The present invention relates generally to the production of curved sheets of glass and more particularly to new and improved apparatus for bending glass sheets.

Curved sheets of glass are widely used as glazing closures, particularly as windows in vehicles such as automobiles or the like. When intended for such use, the sheets must be bent to rather precisely defined curvatures determined by the size and shape of the opening in which they are to be mounted and by the over-all styling of the vehicle.

One procedure for producing curved glazing closures of the above character includes heating substantially flat glass sheets to an elevated temperature at which the glass softens and then pressing or shaping the softened sheets between complemental shaping surfaces formed on a bending mold and contoured to conform to the desired curvature of the finished sheets.

After the sheets are bent in the above manner, their temperature is reduced whereupon the glass sets and the sheets retain the curvature imparted thereto. The rate at which the temperature of the glass is reduced affects the physical characteristics of the bent sheets. As is well known in the art, when a body of glass is rapidly cooled from a temperature near the softening point of the glass to a temperature below its annealing range, a process known as tempering, the outer surface or "skin" of the glass body is placed under compressive stress thereby increasing the impact resistance and improving the breaking characteristics of the glass. Glass sheets intended for use as vehicle windows are commonly treated in this manner.

Bending glass sheets to precisely defined curvatures by press bending techniques requires that the shaping surfaces on the bending mold be accurately contoured. Moreover, since the shaping surfaces are brought into pressing contact with the surfaces of the sheets while they are in a heat softened condition, to avoid marring the sheets, the shaping surfaces must at all times be smooth and free of any surface imperfections which would be impressed into the surfaces of the sheets. In the commercial production of the glazing closures, wherein the shaping surfaces are repeatedly brought into contact with the heated sheets, the heat, pressure and wear detrimentally affect the mold and considerable maintenance is required to maintain the mold in the proper condition.

The primary object of the invention is to provide an improved apparatus for bending glass sheets which apparatus is not adversely affected by prolonged exposure to the elevated bending temperature.

Another object is to provide an apparatus for bending glass sheets with means for reducing the temperature of the sheet engaging surface.

A further object is to provide a bending mold through which cooling gases are circulated thereby to maintain the temperature of the mold within a desired range.

Other objects and advantages of the invention will become more apparent during the course of the following description when read in connection with the accompanying drawings.

In the drawings, wherein like numerals are employed to designate like parts throughout the same:

Figure 1:
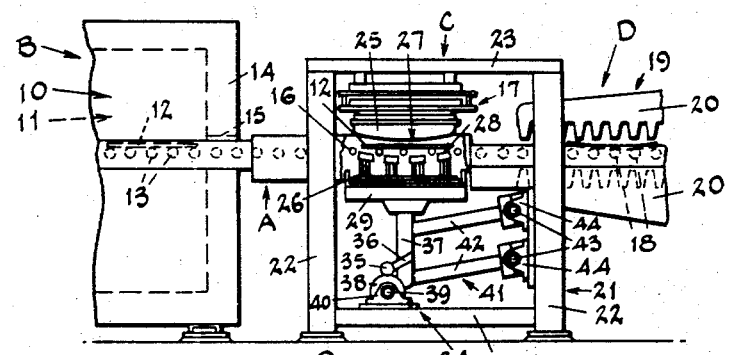
FIG. 1 is a fragmentary side elevational view of a bending and tempering apparatus incorporating the novel features of the present invention with parts broken away.

Although the mold or shaping member of this invention could be used to advantage in any press bending application, it will be illustrated herein in connection with a horizontal bending and tempering apparatus.

In the production of curved windows in relatively large quantities on a commercial basis, the glass sheets are heated, bent and subsequently tempered in a substantially continuous process. To this end, the sheets are successively moved along a predetermined path through a heating section, a bending section and a cooling section, which sections are contiguous so that each sheet, upon being moved through one section, passes immediately into the next section.

In the drawings, for purposes of illustration, there is shown a bending and tempering apparatus incorporating the novel features of the present invention, which apparatus is capable of producing bent and tempered glass sheets in a continuous commercial process similar to that described above. The apparatus includes a conveyor system A operable to carry glass sheets along a predetermined path through a heating section B wherein the sheets are heated to the desired temperature, a bending section C wherein the sheets are formed to the desired curvature and a cooling section D wherein the sheets are rapidly cooled to produce the desired temper in the glass.

The heating section B, in the present instance, comprises a tunnel-type furnace 10, having a heating chamber 11 defined by refractory walls and heated by suitable heating devices (not shown). The flat sheets of glass 12 are loaded onto a roll-type conveyor 13, a part of the conveyor system A, at the entrance end (not shown) of the heating chamber 11 and are heated to a temperature corresponding substantially to the softening point of the glass as they move through the chamber. The heated sheets then emerge from the exit end 14 of the furnace through an opening 15 and are received on a second roll-type conveyor 16, also a part of the conveyor system A, and are moved into the bending section C to be formed to the desired curvature by a bending means 17.

After being bent, the sheets are advanced onto a third roll-type conveyor 18 which is disposed in end-to-end aligned relation with conveyors 13 and 16 and is also a part of the conveyor system A. The third conveyor 18 moves the sheets through the cooling section D which includes means 19 for cooling the sheets. In the present instance, the cooling means comprises blast heads 20 disposed above and below the conveyor 18, which blast heads are operable to direct cooling gases, such as air, toward and against the opposite surfaces of the sheets moving on the conveyor.

The bending means 17 is mounted on a framework 21 which includes two upright columns 22 at each side of the path and spaced apart longitudinally along the path with corresponding columns at opposite sides of the path being transversely aligned. The columns 22 are tied together by a plurality of longitudinally and transversely extending upper and lower beams 23 and 24.

The bending means 17 includes male and female mold parts 25 and 26 which are mounted for relative movement towards and away from each other to bring opposed complemental male and female shaping surfaces 27 and 28 formed thereon into pressing engagement with the opposite surfaces of the sheets.

Although either or both of the mold parts may be movably mounted, in the disclosed apparatus the male mold part 25 is fixedly secured above the path to the upper beams 23 of the framework 21 with the shaping surface 27 facing the path of the moving sheet. Herein, this shaping surface 27 is continuous and adapted to engage the entire upper surface of the glass sheet being bent.

The female mold part 26 is of open ring-type construction having a shaping surface 28 which engages only the marginal portions of the sheets. The mold part 26 is attached to a carriage 29 disposed below the path of the moving sheet and mounted on the framework 21 for vertical movement toward and away from the male mold part 25 between an open position wherein the mold part is located below the path of the moving sheets and a closed position wherein the mold part is located above the path and in close proximity to the male mold part thereby to press a glass sheet between the complemental shaping surfaces.

The outline shape of the ring forming the female mold part 26 is determined by the outline configuration of the glass sheets to be bent. Thus while the ring is illustrated herein as being substantially rectangular, it will be appreciated that this ring could be of any shape.

Figure 2:
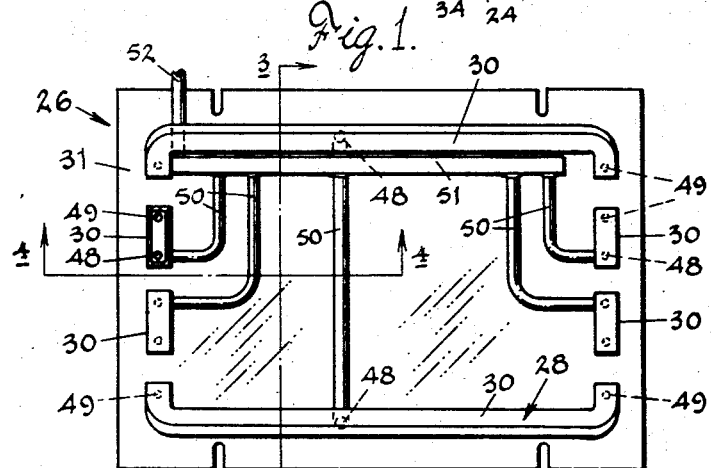
FIG. 2 is a plan view partially in section of a bending mold constructed in accordance with this invention.

To permit the mold part 26 to be moved relative to the conveyor between the raised and lowered positions, the ring comprises a number of individual sections 30 arranged end-to-end in the desired outline pattern with adjacent ends of the sections being spaced apart to permit the sections to move between the rolls of the conveyor 16 (FIG. 1). Thus, as best shown in FIG. 2, in the present instance, the sides of the mold part extending transversely of the path are formed from generally U-shaped sections 30 spaced apart longitudinally of the path with the legs extending inwardly toward one another. The sides of the mold part extending longitudinally of the path are formed by relatively short sections spaced apart to permit the sections to be moved between the rolls of the conveyor 16. All of the sections 30 are supported on the carriage 29 by a base plate 31. Each section is mounted on the upper ends of posts 31′, the lower ends of which are threaded into a base plate 31 supported by the carriage. The shaping surface 28 is formed on the upwardly directed faces of the sections.

The sections 30 preferably are made of metal or similar material capable of withstanding the high temperature to which the mold is subjected. These materials, however, have a tendency to fuse to glass when the latter is heated to the elevated temperatures necessary for bending and thereby to mar the sheet surface. To avoid this, the sheet contacting surface of the mold part is provided with a cover 32 of refractory material which will not fuse to the heated sheets. This cover preferably takes the form of relatively thin strips of refractory coextensive with and conforming to the shaping surface 28 and cemented thereto through the medium of a suitable adhesive 33 such as an epoxy resin or the like. The upper sheet contacting surface of the cover is dressed to a smooth finish to remove any imperfections which could mar the sheets.

Since the mold part 26 is usually at a considerably lower temperature than the heated glass sheet, the mold part absorbs heat from the sheet during the bending procedure. If the rate of heat transfer between the mold part and the sheet is relatively fast, chill cracks or similar imperfections appear in the glass. The rate of heat transfer may be held within acceptable limits by selecting a refractory cover which acts as an insulation between the mold part and the sheet and effectively retards the heat transfer between these parts.

Raising and lowering of the carriage 29 and the female mold part 26 carried thereby toward and away from the male mold part may be effected by any suitable actuating mechanism 34, such as the illustrated cam and follower arrangement. Although only one such mechanism can be seen in FIG. 1, two are utilized with one being disposed on each side of the path of movement of the glass sheet. Since the mechanisms are identical in construction, a detailed description of one will suffice for the present purposes.

The mechanism 34 includes a cam follower 35 mounted on an arm 36 fixedly secured to a bar 37 depending from a lower surface of the carriage 29. The follower 35 rides on the periphery of a rotatable disc cam 38 contoured in a conventional manner to impart the desired reciprocal motion to the follower 35 and thus to the carriage 29 supporting the female mold part. The disc cam 38 is mounted on a shaft 39 disposed below the path and extending transversely across the path with its opposite ends journaled in bearings 40 mounted on the spaced lower beams 24. Any conventional power means (not shown) may be provided to rotate the shaft 39 and thereby effect the desired reciprocal motion of the female mold part.

The carriage 29 and female mold part 26 are guided for reciprocal movement in a vertical plane toward and away from the male mold part by a four-bar linkage system 41 which includes two pairs of spaced parallel links arranged to form a parallelogram. One pair of spaced parallel links of the system 41 includes the bar 37 depending from the carriage 29 and one of the columns 22 of the framework 21. The second pair of parallel links comprises two cross members 42 extending between the bar 37 and the column 22 with one end of each cross member pivoted to the bar at spaced points therealong and the opposite end secured to shafts 43 extending between the transversely aligned columns 22. The shafts are journaled in bearings 44 mounted on the spaced columns 22 to rock about fixed parallel axes. With this arrangement, the bar 37 remains parallel to the column 22 as the carriage is moved between the raised and lowered positions thereby maintaining the female mold part in proper registry with the male mold part.

In operation, a heated sheet emerging from the furnace is moved by the conveyor 16 into the bending section C and between the mold parts. Then in response to a signal emanating from a device (not shown) sensing the movement of the sheet along the path, which device may be a photoelectric cell or the like, a bending sequence is initiated, wherein the female mold part 26 lifts the heated sheet off of the conveyor 16, carries it into pressing engagement with the male mold part 25 and thereafter returns the bend sheet to the conveyor.

From the foregoing, it will be appreciated that throughout the actual pressing operation the shaping surface 28 on the female mold part 26 is in contact with the heated glass sheet. In the commercial production of bent glass sheets with the illustrated apparatus, during which the female mold part is repeatedly brought into contact with sheets at a temperature of approximately 1250° F., it has been found that this mold part is heated to relatively high temperatures in the neighborhood of 575° F. The heat thus absorbed by the mold part can cause the mold part to warp, changing the outline configuration or the curvature of the ring and, moreover, can have an adverse effect on the shaping surface of the mold part. For example, when heated to these elevated temperatures, the adhesive 33 may burn or carbonize permitting the cover 32 to pull away from the mold part thereby changing the curvature defined by the shaping surface 27. Furthermore, it has been observed that, when heated to these temperatures, the refractory cover 32 may break down and become roughened thus tending to mar the sheets. Defects such as these necessitate reworking or replacing the mold part which involves considerable expense and loss of production.

In accordance with the present invention the female mold part is cooled during the bending operation to prevent its being heated to those elevated temperatures at which the above-mentioned defects occur. Further this cooling is accomplished without interfering with the operation of the pressing apparatus so that the mold part may be cooled continuously throughout the production run.

To this end, the female mold part is provided with passageways through which a cooling fluid is circulated to absorb heat from the mold part and carry this heat away from the mold part. In the illustrated embodiment, the passageways are provided in each of the individual sections making up the female mold part and these passageways are coupled to a source of cooling fluid operable to supply a continuous flow therethrough.

Figure 3:
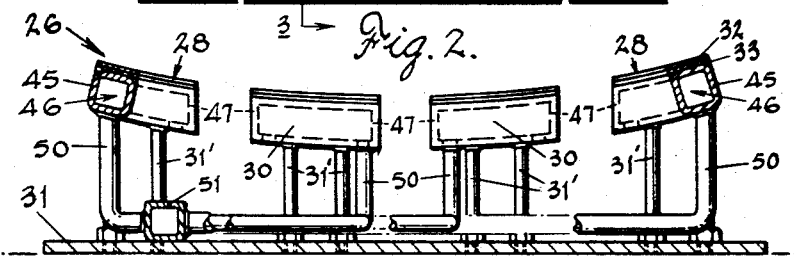
FIG. 3 is a sectional view taken along lines 3—3 of FIG. 2.
Figure 4:
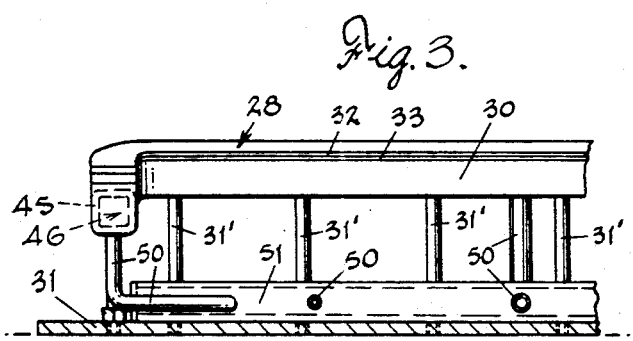
FIG. 4 is a sectional view taken along lines 4—4 of FIG. 2.
Figure 5:
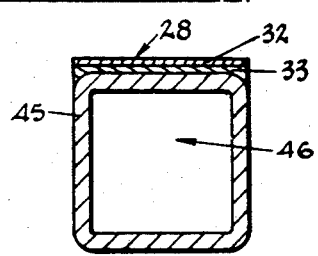
FIG. 5 is an enlarged cross section view of a portion of the mold structure shown in FIG. 2.

As shown in FIG. 3 in the present instance, each of the sections 30 making up the ring which constitutes the female mold part 26 is formed from a tubular member 45 having an axial passageway 46 blocked at the opposite ends by cover end plates 47 to close the passageway. In the illustrated embodiment, the tubular members 45 are rectangular in the cross section and their upper surfaces comprise the shaping surface 28 of the mold part. Inlet and outlet openings or ports 48 and 49 are provided in the lowermost side of the member 45 spaced apart along the passageways. A cooling fluid, air in the present instance, is introduced into each of the passageways through conduits 50 communicating at one end with the inlet ports 48 and at the other end with a manifold 51 supported on the carriage below the mold part and coupled to a source (not shown) of cooling air under pressure by a pipe 52. The cooling air flows from the manifold 51 through the conduits 50 and into the passageways 46 and is discharged from the passageways into the ambient atmosphere below the shaping surface 28 of the mold part through the outlet ports 49. During its movement through the passageways, the air absorbs heat from the tubular members particularly those portions forming the shaping surface of the mold part and discharges this heat into the atmosphere surrounding the mold part.

It will be appreciated that a ring type mold part constructed in accordance with the present invention may be easily maintained at a temperature below those having a detrimental effect on the mold part thereby increasing its service life and enabling it to withstand long production runs wherein a relatively large number of sheets may be bent to precisely defined curvatures with a minimum of marring of the surfaces thereof without the need of frequent reworking or replacing of the mold part.

It is to be understood that the form of the invention herewith shown and described is to be taken as a preferred embodiment of the same, and that various changes in the shape, size and arrangement of parts may be resorted to without departing from the spirit of the invention.

I claim:

1. Apparatus for bending glass sheets by pressing the sheets between opposed complemental shaping surfaces formed on mold parts relatively movable toward and away from each other, a female mold part comprising tubular members having top, bottom and side walls defining axial passageways therethrough and arranged in an open ring conforming in outline to the outline of the sheet to be bent, a shaping surface formed on the top walls of said tubular members to engage the marginal portions of a sheet to be bent, said tubular members having inlet and outlet ports formed therein and communicating with said passageways, and means coupling said inlet openings to a source of cooling fluid whereby said fluid is introduced into said passageways to flow therethrough in contact with the top walls thereof and out of said outlet ports.

2. In apparatus for bending glass sheets, a conveyor for supporting a sheet to be bent for movement along a predetermined path, a male mold part disposed above said conveyor and having a downwardly directed shaping surface formed thereon, an open ring-type female mold part disposed below said male mold part and having an upwardly directed complemental shaping surface formed thereon to engage the marginal edge portions of a sheet, means mounting said female mold part for movement relative to said path toward and away from said male mold part, said female mold part being tubular and having a top, bottom and side walls defining an axial passageway formed therein, said complemental shaping surface being formed on said top wall, inlet and outlet ports communicating with said axial passageway, means introducing a cooling fluid through said inlet port to flow along said axial passageway in contact with the top wall thereof and out of said outlet port into the ambient atmosphere.

3. In apparatus for bending glass sheets as claimed in claim 2, wherein said conveyor comprises a plurality of rollers parallelly spaced apart and extending transversely across said path, and said female mold part comprises a plurality of tubular members disposed end-to-end in an open ring with adjacent ends being spaced apart to permit said members to pass between adjacent rollers of said conveyor, and means introducing a cooling fluid into each of said tubular members.

4. In apparatus for bending glass sheets, a conveyor for supporting a sheet to be bent for movement along a predetermined path, a male mold part disposed above said conveyor and having a downwardly directed shaping surface formed thereon, a female mold part comprising a plurality of tubular members arranged end-to-end in an open configuration, said tubular members having top, bottom and side walls defining passageways therein, an upwardly directed complemental shaping surface formed on the top walls of said tubular members, means mounting said tubular members for movement toward and away from said male mold part between an open position wherein said female mold part is disposed below said conveyor and a closed position wherein said female mold part is disposed above said conveyor in close proximity to said male mold part, means coupling said tubular members to a source of cooling fluid whereby said fluid is introduced into the passageways in said tubular members to flow therethrough in contact with top walls thereof.

5. In apparatus for bending glass sheets, the combination of a conveyor comprising a plurality of spaced rollers adapted to carry a glass sheet to be bent along a predetermined substantially horizontal path, a male bending mold disposed above said path and having a downwardly directed shaping surface formed thereon, a female mold part disposed below said male mold part and having a complemental upwardly directed shaping surface formed thereon, said female mold part comprising a plurality of tubular members arranged end-to-end in an open configuration with adjacent ends of the members being spaced apart, said tubular members having top, bottom and side walls defining passageways therein, and said complemental shaping surfaces being formed on said top walls, means mounting said tubular members for movement relative to said path toward and away from said male mold part, whereupon said members pass between the adjacent rollers of said conveyor thereby to lift a sheet off of the said conveyor and carry it into pressing engagement with said male mold part, each of said tubular members having an inlet and outlet port formed therein, a manifold disposed adjacent said female mold part, means coupling said manifold to said inlet ports in each of said tubular members, and means supplying a cooling fluid to said manifold to flow through the passageways in said tubular members in contact with the top walls thereof and out of said outlet ports thereby to cool said tubular members.

References Cited

UNITED STATES PATENTS 3,244,497 4/1966 Copeland _____ 65—356 X
3,329,494 7/1967 Carson et al. _____ 65—275 X DONALL H. SYLVESTER, *Primary Examiner.*

ARTHUR D. KELLOGG, *Assistant Examiner.*

U.S. Cl. X.R.

65—106, 275, 288, 356